United States Patent [19]

Hnat

[11] Patent Number: 5,114,122
[45] Date of Patent: May 19, 1992

[54] APPARATUS FOR HEAT PROCESSING GLASS BATCH MATERIALS

[76] Inventor: James G. Hnat, 3774 Lewis Rd., Collegeville, Pa. 19426

[21] Appl. No.: 541,986

[22] Filed: Jun. 21, 1990

Related U.S. Application Data

[62] Division of Ser. No. 320,737, Mar. 8, 1989.

[51] Int. Cl.$^5$ ............................................... C21B 7/16
[52] U.S. Cl. ..................................... 266/186; 266/172
[58] Field of Search ................................. 266/172, 186

[56] References Cited

U.S. PATENT DOCUMENTS

| | | | |
|---|---|---|---|
| 2,894,831 | 7/1959 | Old | 266/172 |
| 3,163,520 | 12/1964 | Collin | 266/172 |
| 4,205,830 | 3/1980 | Beggs | 266/186 |
| 4,958,808 | 9/1990 | Hauk | 266/186 |

*Primary Examiner*—Peter D. Rosenberg
*Attorney, Agent, or Firm*—Caesar, Rivise, Bernstein, Cohen & Pokotilow, Ltd.

[57] ABSTRACT

An apparatus and method are disclosed for processing glass-making materials under oxidizing conditions, and for processing materials, such as hazardous or toxic wastes, or smelting under reducing conditions. As a glass-making apparatus the invention includes a cyclone melt reactor for forming a liquid glass melt and a combustion preheater for receiving the glass-making materials and combusting the fuel and oxidant therein to heat the glass batch materials to a temperature at least equal to the melt temperature of the glass batch material. The combustion preheater has an outlet connected to the glass melt reactor, and at least one inlet is provided into the combustion preheater for introducing oxidizing materials and for creating a well-stirred region within the combustion preheater means. Supplemental heat can be provided by introducing a heated transfer gas into the combustion preheater, and a fuel gasifier can be provided for producing a fuel gas before the fuel gas is injected into the combustion preheater.

For processing materials under reducing conditions, the cyclone melt reactor is connected to a preheater/reducing chamber and preheated reducing gas is introduced into the reducing chamber in such a manner that a well-stirred region is created within the reducing chamber. Heated transfer gas from a supplemental heat source and reducing gas from a fuel gasifier can also be introduced into the reducing chamber.

9 Claims, 7 Drawing Sheets

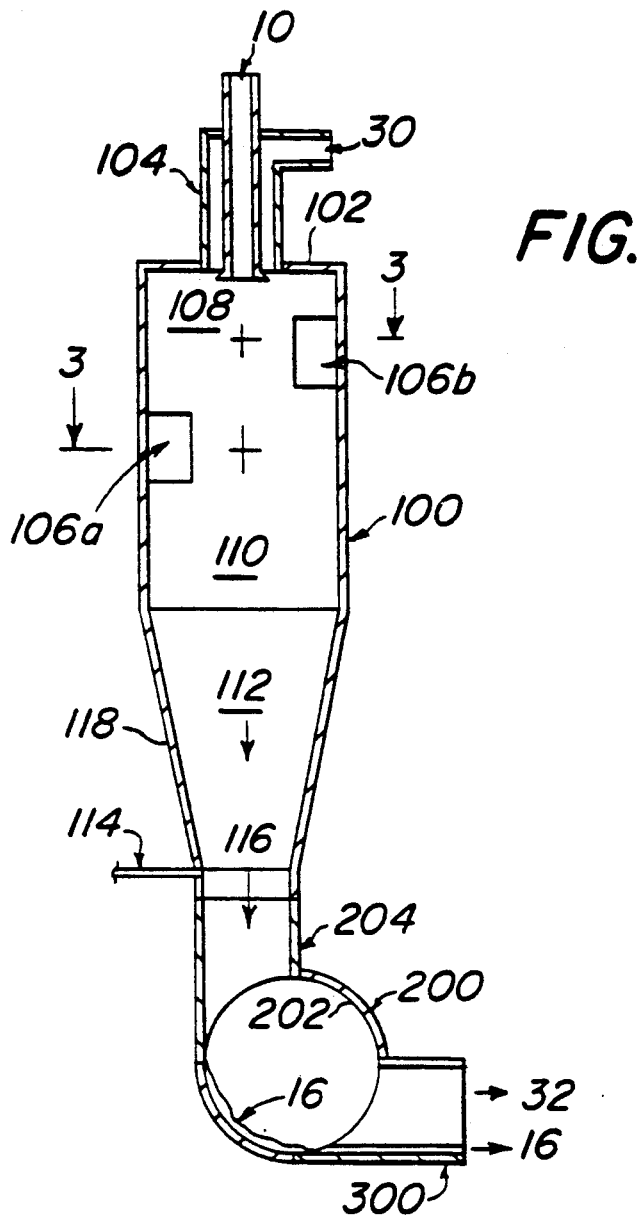
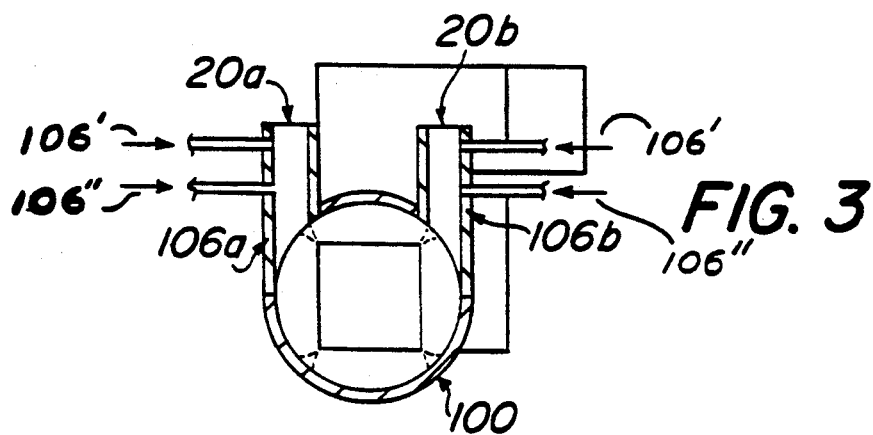
FIG. 2
FIG. 3

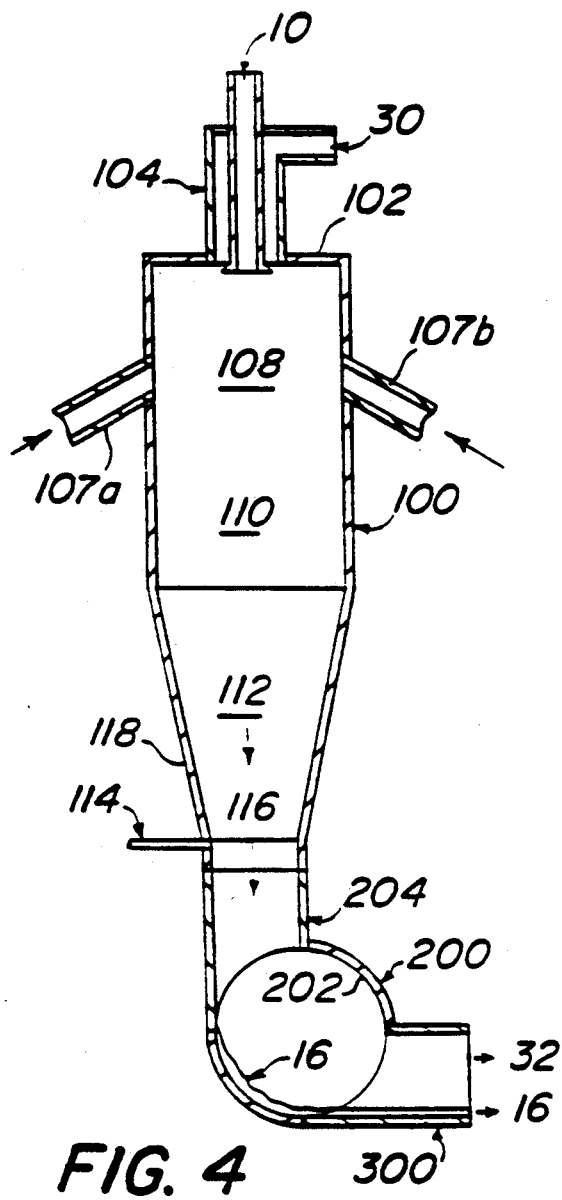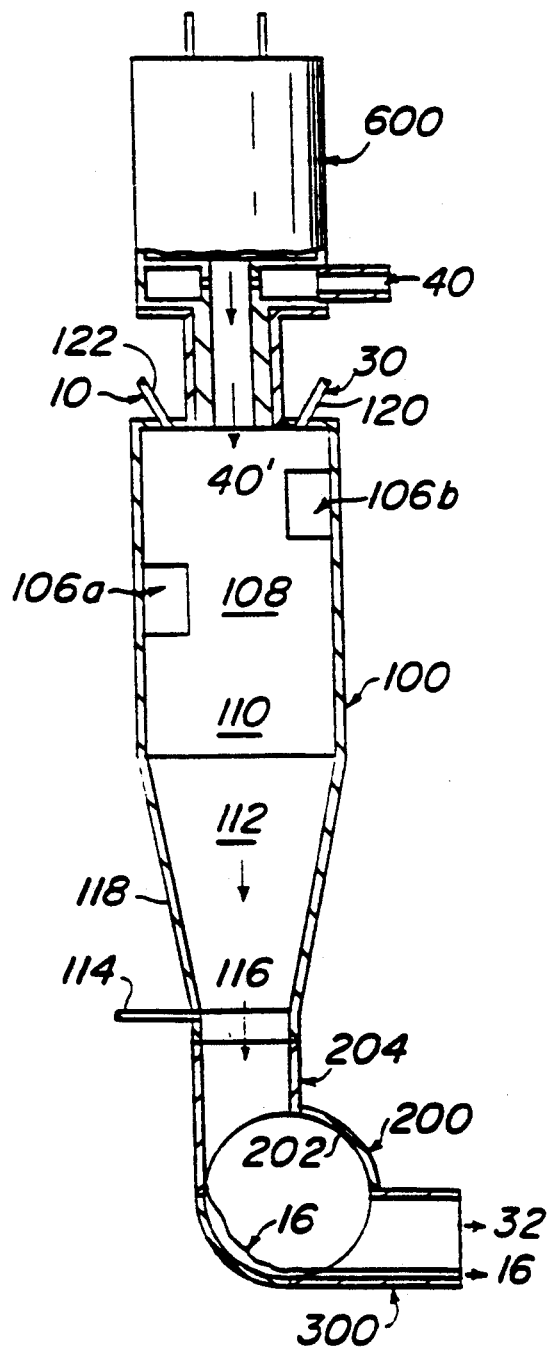

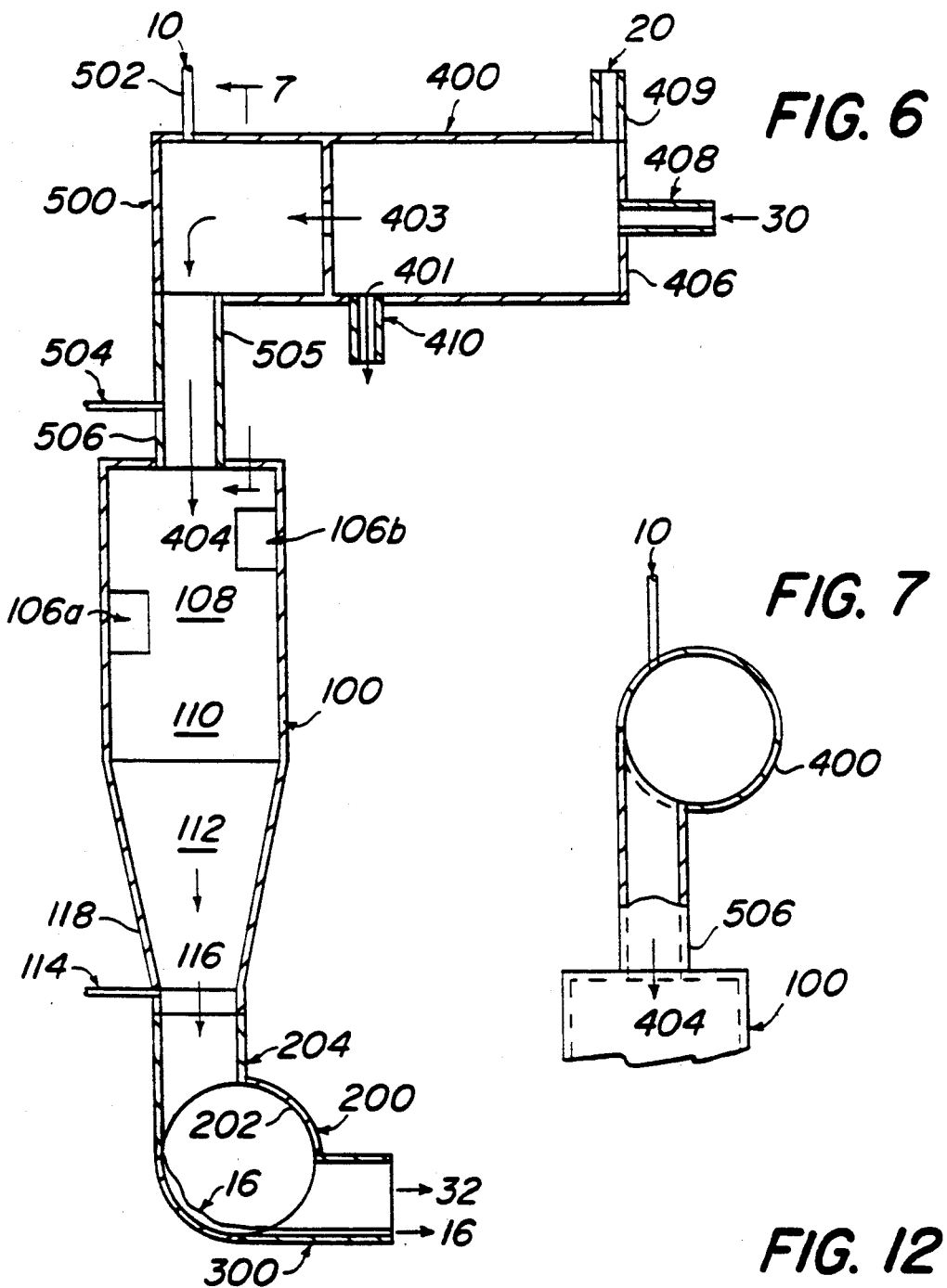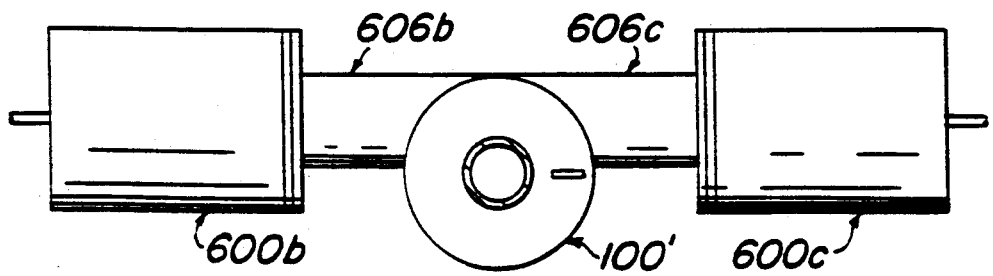

APPARATUS FOR HEAT PROCESSING GLASS BATCH MATERIALS

This application is a divisional of application Ser. No. 320,737, filed Mar. 8, 1989.

FIELD OF THE INVENTION

This invention relates to glass production and in particular relates to preheating of glass batch materials in a combustion preheated prior to rapidly melting the glass batch materials in a cyclone melting chamber. The apparatus and process are also applicable to the melting of other materials and to treatment of hazardous, toxic or infectious waste materials.

BACKGROUND OF THE INVENTION

Many attempts have been made to improve the efficiency of glass melting furnaces over the past 50-75 years. To date, however, very few new melting concepts have been adopted by the glass industry.

These attempts to increase glass melting/glass production efficiency have included, in particular, glass batch material preheating techniques used in conjunction with different glass melting methods to increase the rate at which the glass melting process occurs. Batch material preheating processes which have been tried include: using moving bed reactors, raining bed reactors, fluidized bed reactors, counter-flow suspension reactors, plug flow type suspension reactors and dump combustors with flame holders to preheat the batch material prior to melting. In addition to attempts to increase efficiency by preheating the batch material, enhanced or improved glass melting processes have included methods utilizing submerged combustion, direct heating of moving batch surfaces, melting over bodies of revolution or other surfaces, melting in rotating cylinders and melting in cyclone type reactors.

Of particular interest with respect to the present invention is glass melting in cyclone type reactors. Previously, patents relating to cyclone type reactors have issued to Ferguson, U.S. Pat. No. 2,006,947; Jack, et al., U.S. Pat. No. 3,077,094; Boivent, U.S. Pat. Nos. 3,443,921 and 3,510,289; Ito, U.S. Pat. No. 3,784,113; Niefyodon et al., U.S.S.R. Pat. No. 0708129 and Hnat, U.S. Pat. No. 4,553,997 and 4,544,394. Each of these patents discloses the use of a cyclone reactor for the final glass melting step and includes combustion or other forms of heat addition, such as penetrating burners within the cyclone melting chamber, in order to elevate the batch materials to the requisite glass melting temperature.

The previous patents to Hnat pay particular attention to the use of various types of cyclone designs as well as the use of specific, separate batch injection locations as means of controlling the losses of higher volatile mineral matter, such as soda ash and borox. Otherwise, the prior cyclone melting approaches for improving glass production efficiency have generally not considered means of limiting the losses of volatile mineral matter such as fluxing agents, viscosity control agents, fining agents or reducing agents prior to melting in the cyclone reactor. In particular, methods of controlling the time-temperature history of the volatile mineral matter in the suspension preheating steps have not been previously developed.

Prior glass melting methods utilizing ash containing fuels, such as coal, have not been successful because of the poor economics associated with coal gasification processes or, as in the case of direct coal firing, because the ash contamination in the glass has been unacceptable from the standpoint of quality control. Even though typical coal ashes have constituent species which are identical to thoses found in commercial glasses, the concentration distribution of the individual constituent species is substantially different. The iron oxide concentrations in coal ashes are typically much higher than concentrations found in common commercial glasses. Coal ashes typically have iron oxide concentrations in the range of 10-20%, whereas most glass compositions have iron oxide concentrations of less than 0.1-0.2%, and iron oxide concentrations for flint container glass must be generally lower than 0.02% if acceptable coloration is to be achieved. The quality control requirements for amber and green bottle glass are less restrictive, but the quality control requirements still generally require that iron oxide concentrations be less than 0.1 and 0.3%, respectively.

With insulation fiberglass, higher levels of iron oxide are tolerable, with iron oxide concentrations of 1-2% being acceptable. Iron oxide levels higher than 1-2% generally lead to a degradation of the insulating value and can cause material compatibility problems with existing fiberizers. Mineral wools, which are often made from blast furnace slags, have iron oxide concentrations in the same range as coal ash; therefore, the production of this product is not very sensitive to coal ash contamination. The efficiency of mineral wool production, however, is substantially less than the production of insulation fiberglass because of the previously mentioned material compatibility problems with high efficiency fiberizers.

Because of the ash contamination problems, and in particular the problem of iron oxide contamination, very few prior glass melting inventions have considered or succeeded in direct firing using coal or other fuels containing substantial amounts of ash as a fuel. In fact, direct firing of conventional open hearth-type furnaces with pulverized coal has been unsuccessful because of ash carry over into the regenerators. Furthermore, refractory corrosion and blockage problems have occurred, as well as the formation of stones and cords within the melt, because of slagging with the furnace chamber.

The abiltiy to fire the glass melting systems with fuels subject to ash contamination is now an important consideration in light of the fuel efficiency and the high temperature heating that can be obtained, but use of these fuels has not, heretofore, been successfully achieved. In the recent prior art of Demarest et al., U.S. Pat. No. 4,634,461, the possibility of using pulverized coal in a rapid glass melting process is taught; however, in that patent the coal ash is actually incorporated into the glass batch materials and the final glass product with no means of controlling the level of ash contamination.

OBJECTS OF THE INVENTION

With this background in mind, it is an object of the invention to provide an apparatus for the formation of a glass melt from glass batch materials, fuel and oxidant under oxidizing conditions wherein the glass forming materials are preheated in a suspension chamber to a temperature above the melt temperature of the batch materials prior to introduction into a cyclone melter where separation and dispersion of the batch materials occurs on the melter wall and a liquid glass melt is obtained.

It is a further object of the invention to provide a preheating suspension chamber wherein the batch materials, fuel and oxidant are mixed in a well-stirred region.

It is a further object of the invention to provide additional heat into the preheating chamber by introducing a heated transfer gas thereinto.

It is another object of the invention to provide a glass melting apparatus capable of using different fuels, such as coal, gas, oil and slurry fuels.

It is another object of the invention to provide a glass melting apparatus capable of using ash-bearing fuel by the addition of a gasifier for gasifying the fuel prior to introduction of the fuel into the preheater chamber.

It is yet another object of the invention to provide a glass melting apparatus wherein the gasifier which prepares the fuel for the preheater is a slagging gasifier which removes soild contaminant particles from the fuel.

It is an object of the invention to provide a glass melting apparatus wherein glass batch materials having different melting points can be introduced into the preheating chamber at different locations.

It is another object of the invention to provide a glass melting method wherein glass batch material, fuel and oxidant are introduced into and combusted within a preheating chamber to a temperature higher than the melting point of said batch materials before being introduced into a cyclone glass melter.

It is another object of the invention to provide a glass melting method wherein the glass batch material, fuel and oxidant are mixed together and combusted in a well-stirred, turbulent region within a preheating chamber.

It is a further object of the invention to provide a glass melting method wherein additional, heated transfer gas can be introduced into a preheating chamber along with glass batch material, fuel, and oxidant in order to increase the temperature during combustion within the preheater.

It is an object of the invention to provide a glass melting method utilizing a preheating chamber and cyclone melting wherein fuels containing solids can be gasified in a slagging gasifier prior to introduction into the preheating chamber.

It is a further object of the invention to provide a glass melting method utilizing a preheating chamber and a cyclone melter wherein the temperature within the preheating chamber can be adjusted.

It is another object of the invention to provide an apparatus and method which can be utilized for processing materials under reducing conditions wherein the materials being treated are heated under reducing conditions in a suspension reducing chamber before being introduced into a cyclone melter.

It is yet another object of the invention to provide an apparatus and method for processing materials under reducing conditions utilizing a reducing chamber and a cyclone melter wherein heat sources are provided for heating reducing materials before introducing the reducing materials into the reducing chamber.

It is an object of the invention to provide an appartus and methods for processing materials under reducing conditions utilizing a reducing chamber and a cyclone melter wherein fuels containing solids can be gasified in a slagging gasifier prior to being introduced into the reducing chamber.

SUMMARY OF THE INVENTION

In furtherance of these objects, an apparatus and methods are disclosed for processing glass-making materials selected from glass batch materials, fuel and oxidant under oxidizing conditions, and in addition, the apparatus can also be used for proccessing materials, such as hazardous or toxic wastes, or smelting under reducing conditions. As a glass-making apparatus the invention includes a cyclone melt reactor for forming a liquid glass melt and a combustion preheater for receiving the glass-making materials and combusting the fuel and oxidant therein to heat the glass batch materials to a temperature at least equal to the melt temperature of the glass batch material. The combustion preheated has an outlet connected to the glass melt reactor, and at least one inlet is provided into the combustion preheated for introducing oxidizing materials and for creating a well-stirred region within the combustion preheater means. A supplemental heat source can also be provided to introduce a heated transfer gas into the combustion preheater, and a fuel gasifier can be provided for producing a fuel gas before the fuel is injected into the combustion preheater.

As an apparatus and method for processing materials under reducing conditions, a cyclone melt reactor is connected to a preheater/reducing chamber and preheated reducing gas is introduced into the reducing chamber in such a manner that a well-stirred region is created within the reducing chamber. Heated transfer gas from a supplemental heat source and reducing gas from a fuel gasifier can also be introduced into the reducing chamber.

BRIEF DESCRIPTION OF THE DRAWINGS

Other objects and many of the attendant advantages of the instant invention will be readily appreciated as the same become understood by reference to the following detailed description considered in conjunction with the accompanying drawings, wherein:

FIG. 2 is a diagrammatic cross-sectional view of an embodiment of the present invention which includes a counter-rotating vortex suspension preheater and a cyclone melter.

FIG. 3 is a sectional view of the counter-rotating vortex suspension preheater taken along the line 3—3 in FIG. 2 showing the opposed swirl orientation of the gas/air inlets.

FIG. 4 is a diagrammatic cross-sectional view of an embodiment of the present invention which includes an impinging jet vortex suspension preheater and a cyclone melter.

FIG. 5 is a diagrammatic cross-sectional view of an embodiment of the present invention which includes a cutway view of a plasma torch on the head end of a counter-rotating vortex suspension preheater.

FIG. 6 is a diagrammatic cross-sectional view of an embodiment of the present invention which includes a slagging cyclone gasifier connected to a counter-rotating vortex suspension preheater.

FIG. 7 is a sectional view of the slagging cyclone gasifier taken along the line 7—7 in FIG. 6 showing the orientation of the batch injection inlet and the hot raw gas exit.

FIG. 12 is a sectional view of an embodiment of the present invention taken along the line 12—12 in FIG. 11.

DETAILED DESCRIPTION OF THE PREFERRED EMBODIMENT

The following detailed description of the preferred embodiment of the invention is made primarily with reference to a glass melting operation under oxidizing conditions for which the invention has been found particularly useful. However, essentially the same equipment used to melt glass can also be used to melt pulverized frits, pulverized slags or flyash. Flyash and slags typically have higher melting points than glass frits, which are previously melted glass products, and therefore the operating temperature of the preheater and melt chambers must be elevated to accommodate these higher melting point materials. The same essential process steps are utilized in both operations. When melting single component materials like flyash, the minimization of volatile losses from the feed stock is not necessary unless fluxing agents are added separately to the system in order to reduce the melting temperature of the feed stock materials.

The invention can also be used for the incineration and glass encapsulation of hazardous or toxic waste under oxidizing conditions. The application of the invention to treating toxic or hazardous wastes is in the incineration of contaminated soils or other waste which contain substantial amounts of inert mineral matter. The formation of a glass material from asbestos fibers is another example of the application of the invention. When used as a toxic waste incinerator, the device is operated above the slagging temperature of the mineral matter residue or ash so that a molten material is formed. Depending on the toxic waste being incinerated, pulverized glass cullet or other glass forming ingredients can be added to the process to form a glass matrix material which can be suitably formed and packaged for safe land filling. For example, the formation of glass marbles or granular size cullet with relatively small surface-to-volume ratio would be a suitable form for disposing of the glass-encapsulated material produced. Inasmuch as the invention requires that the feed stock used be pulverized, means for particle size reduction of the feed stock and transporting of the toxic waste material to the heat processing unit must be provided. Materials which are sticky or not transportable by pneumatic means can be transported to the heat processing unit in an oil or water slurry. When a transport oil slurry is used, the oil can be used as the fuel for the incineration process. Because the process unit typically operates at temperatures in excess of 2600° F., any hydrocarbons within the toxic waste will be driven off and burned in the suspension preheater assembly, which will typically be operated with excess air to accommodate the burning of hydrocarbons volatized during the suspension preheating of the toxic waste materials.

Figure 1:
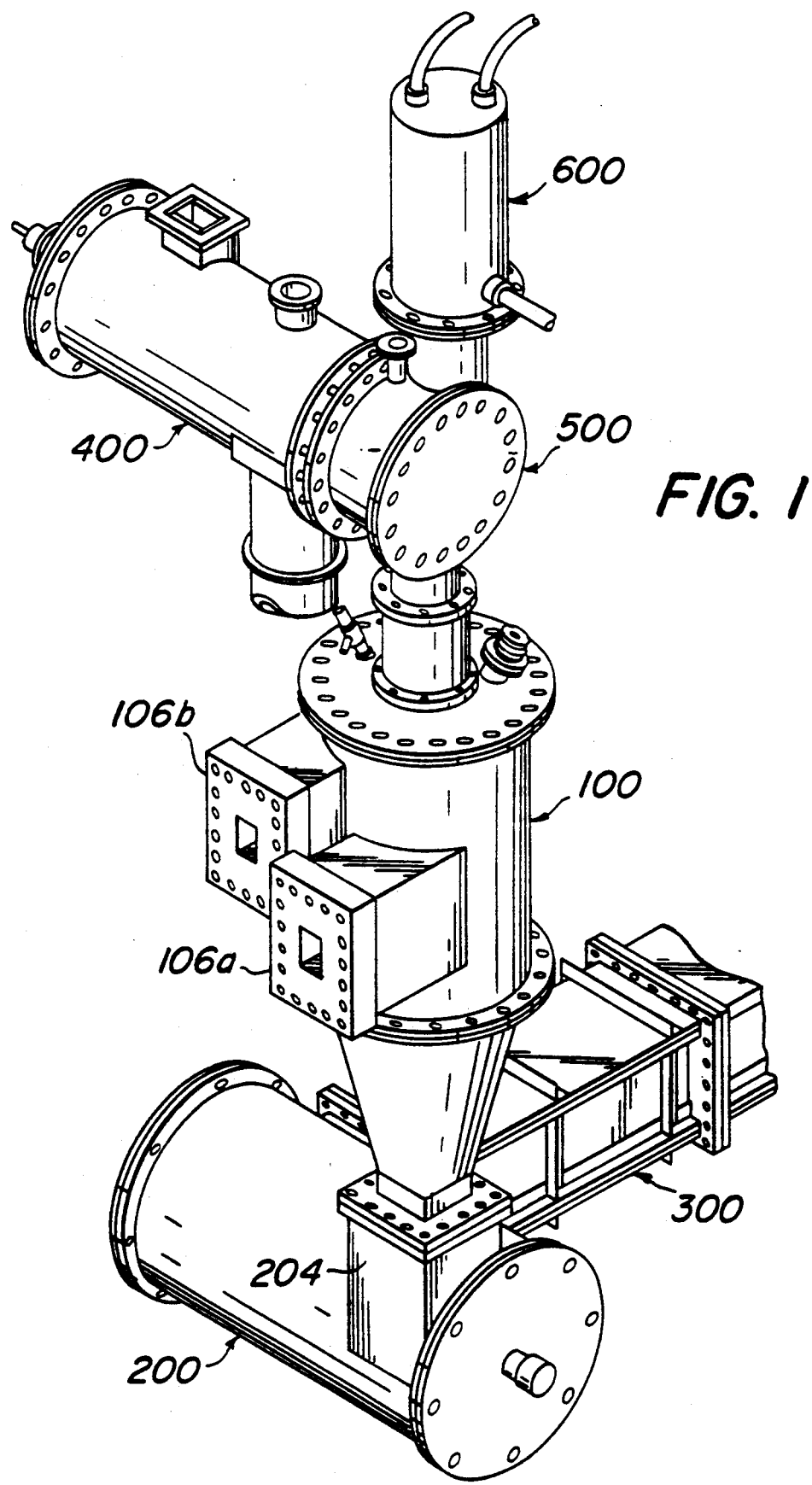
FIG. 1 is an isometric view of the glass melting apparatus of the present invention showing the major components of the preferred embodiment.

Referring in greater detail to the various figures of the drawings wherein like reference characters refer to like parts, the melting apparatus of the present invention is generally shown in FIG. 1. The primary components of the apparatus of the invention include a suspension-type preheater chamber 100, a cyclone melting chamber 200 at the discharge end of the preheater chamber 100, a cyclone exit assembly 300 at the discharge end of the melting chamber 200, a slagging cyclone gasifier 400, a plasma torch gas preheater assembly 600 and a gasifier/preheater interface assembly 500 joining the gasifier 400 and the plasma torch assembly to the preheater chamber 100.

While FIG. 1 shows the interconnection of all of the above identified components, the basic functional apparatus may comprise only the cylindrical type combustion preheater 100, the cyclone melting chamber 200 and the cyclone exit assembly 300. This construction is shown in FIG. 2. As shown in FIG. 2, fuel 30 is introduced into the top or head end 102 of the preheater 100. The fuel 30 is introduced along with the glass batch material 10 through an injector assembly 104 which is located at the head end 102 of the preheater 100 and which is coaxial with the longitudinal axis of the preheater chamber 100.

The preheating step is very important to the invention. The well stirred/plug flow suspension preheater 100 enhances the convective heat transfer to the particulate matter, while providing combustion stabilization when combustion occurs within the preheater vessel. Due to the intense mixing, there is rapid heat release in the combustion processes which take place. By selecting the proper injection location and velocity, the interaction of the particulate mineral matter with the walls of the preheater can be either minimized or maximized. Axial injection will tend to minimize interaction with the preheater wall while tangential injection tends to maximize the interaction with the reactor wall, particularly in the embodiments which utilize high levels of swirl.

As shown in FIG. 3, preheated air or other suitable gaseous oxidizing material 20a, 20b is introduced into the preheater 100 through two or more inlet ports 106a, 106b. These gaseous oxidizing materials 20a, 20b are introduced in such a manner that they produce turbulent mixing of the injected fuel 30 with the oxidizing material 20a, 20b and the glass batch material 10. The result is a mixture of fuel, oxidizer and glass batch material in the upper region 108 of the preheater 100. Within this upper region 108, the gasses present are well stirred or well mixed, but the particulate matter (e.g., glass batch material) in this region 108 is not necessarily well stirred or evenly distributed throughout the volume of region 108.

When a counter-rotating preheater is used as shown in FIGS. 2 and 3, the inlet ports 106a, 106b are tangential to the vessel walls and are spaced at different levels. The jets are typically vertically spaced on the order of $\frac{1}{4}$ to 1 reactor vessel diameter apart. When an opposed or impinging jet preheater is used as shown in FIG. 4, the inlet jet ports 107a, 107b are at the same level and are preferably directed at an upward angle of approximately 45°, although the angles may range from 30°-60°. The jet ports 107a, 107b of the opposed jet preheater are typically positioned such that the issuing streams or jets impinge on each other or on a third, preferably downwardly directed, stream issuing along the centerline from the head end 102 of the chamber 100. While upwardly directed impinging jets are preferable, it is envisioned that an embodiment is possible where the jets might be downwardly directed as found in some coal gasifying devices.

The combustion of the fuel 30 and the oxidizing material 20a, 20b within the upper region 108 of the preheater 100 results in a high intensity heat release and further results in a rapid rate of heat transfer to the particulate matter (e.g. the glass batch materials) suspended in the gas flow within this region. Burning within the preheater occurs via the mixing and stirring of the fuel and oxidizer within the well-stirred region of the reactor. The ignition occurs within the preheater with the aid of a pilot burner or conventional electrical ignition assembly. In the preferred embodiment, high temperature air preheat ($>1200°$ F.) will be provided via a commercially available heat recuperator. In these cases radiation from the preferable refractory lined reactor walls will generally establish auto ignition of the various fuel and oxidizer mixtures to be used. Strong recirculation in the upper region 108 of the preheater 100 is created by counter-rotating vortices or impinging jets, thus providing the primary means of flame stabilization within the preheater. Without this strong recirculation of the combustion gases, flame extinguishment tends to occur due to the quenching of the flame by the inert batch materials or other mineral matter within the preheater assembly. This is particularly true of mineral matter, such as limestone, which liberates substantial amounts of $CO_2$ upon heating. When low heating value fuels are used, auxiliary gas injection, separate igniters or pilot burners can also be used as a means of providing flame stabilization within the preheater.

When the preheater 100 is a cylindrical type combustion chamber, the primary flame and heat release occurs in the upper region 108 which occupies a chamber volume with a length to diameter ratio of appoximately 0.5:1–1.5:1, and preferably 1:1. The strong mixing of the fuel and oxidizer within this region permits the effective combustion of many types of fuels, including gaseous, liquid, solid or liquid-solid slurry type fuels, in the presence of substantial amounts of pulverized glass batch material which is essentially non-combustible in nature.

Slurry fuels, such as coal-water slurries or coal-oil slurries can either be burned directly in the well-stirred/plug flow preheater 100 by utilizing suitable commercially available or modified injection/atomization assemblies, or they can be first gasified in a cyclone gasifier and the hot raw gas subsequently burned in the preheater. The latter approach provides a means of separating out the ash in the fuel so that contamination of the product by the coal ash is minimized.

Downstream of the upper region 108 within the preheater 100 is a lower or plug flow region 110 wherein a plug flow of gas and solid or liquid particles is produced and wherein final combustion of the fuel 30 is completed. By plug flow it is meant that the gas recirculation patterns have abated and the primary direction of flow is parallel to the longitudinal axis of the reactor. The effective length-to-diameter ratio of the plug flow region 110 is, again, approximately 0.5:1–1.5:1, and preferably, 1:1. The gaseous materials, fuel 30 and oxidizers 20a, 20b, and the entrained glass batch materials 10 within this plug flow region 110 are accelerated through a converging section 112 of the preheater chamber 100. From the converging section 112, the gas and entrained batch materials are delivered without further combustion, but at an average temperature which exceeds the melting point of the glass product, into a cyclone-type melting chamber 200 wherein separate, dispersion, mixing and melting of the preheated batch materials occurs along the walls 202 thereof without further combustion of fuel.

It is the intention of the invention to heat the batch materials in suspension and to minimize liquid glass formation along the walls of the preheater 100. However, when low melting point species are included as part of the batch mixture, some liquid glass specie formation will occur along the walls of the preheater by vapor phase condensation or by turbulent deposition. The amount of glass formation along the walls of the preheater relative to the amount of glass formation in the cyclone melter should be relatively small (i.e., typically less than 10%).

The melted glass product 16 formed on the walls 202 of the cyclone melting chamber 200 and hot gases 32 from the cyclone chamber exit the cyclone melting chamber 200 through the exhaust duct assembly 300 which is preferably positioned tangential to the walls of the cyclone melting chamber.

To produce the appropriate plug flow in the lower plug flow region 110 of the counter-rotating preheater 100, it is necessary to correctly proportion the momentum of the inlet streams 20a, 20b of the oxidizing material. This proportioning can be achieved by adjusting the mass flows and inlet velocities of the oxidizing streams 20a, 20b into the preheater by suitable conventional control valves and by adjusting the dimensions of the inlet locations 106a, 106b. In a counter-rotating vortex combustor, it has been found that equal momentum inlet jets do not necessarily lead to plug flow downstream of the well-stirred region 108. Therefore, momentum adjustment of the individual streams must be made in order to achieve the desired plug flow pattern in the lower region of the preheater. In the impinging jet reactor design, it is generally necessary that the jets of oxidizing material be of equal momentum in order to achieve a well developed plug flow (i.e., minimal residual swirl) in the lower region of the preheater.

If the gas flow patterns in the upper and lower regions are established properly, then the time-temperature history of the injected glass batch materials leaving the preheater can be controlled by suitably adjusting the batch material inlet location, the inlet direction, the velocity of the batch materials at the inlet and the particle size distributions of the individual batch materials. When it is not critical that the interaction of the batch materials 10 with the preheater walls be minimized (e.g., during the melting of glass cullet or glass frit), it may be acceptable to introduce these materials into the preheater along with the oxidizing materials through the inlet ports 106a, 106b. For example, as shown in FIG. 3, inlets 106', 106" may be provided into the inlet ports 106a, 106b. Inlets 106' may be used to inject additional batch materials 10 into the inlet ports for injection into the preheater 100, and inlets 106" may be provided to inject additional fuel 30 into the inlets. In this embodiment, the concentration of particulates in the recirculation vortices will be greater, and the interaction of the particulates with the walls of the preheater will be greater. If the materials introduced readily melt and form along the reactor walls a liquid glass layer which is continuously removed, then the interaction of the particulate matter with the reactor walls is not a critical matter. However, the preferred method of batch material preheating is to minimize the amount of particulate interaction with the preheater walls.

It is also possible to provide separate injection of low melting point batch materials into the exit region 116 of the preheater 100 or into the vicinity of the inlet 204 into the cyclone assembly 200. Such a location shown at the inlet 114 through the wall 118 of the converging section 112.

Convective heat transfer to the glass batch materials suspended in the combustion preheater 100 is the primary heat transfer mechanism. Radiation heat transfer plays a lesser role in this type of process than in conventional open-hearth type furnaces. The average gas temperature within the preheater 100 affects the ultimate preheat temperature achieved by the batch materials passing therethrough. Therefore, the preheater temperature is another control variable in this invention. The temperature of the preheater 100 is controlled by adjusting combustion stoichiometry, the level of oxidizer present, the level of oxygen enrichment and the type of fuel utilized. Combustion stoichiometry is controlled by adjusting the fuel/air ratio. This is done using conventional fuel and air flow control techniques. The level of oxygen enrichment is adjusted by utilizing an outside oxygen source and using conventional techniques for mixing and proportioning the amount of air and oxygen used in the process. As presented in this invention the air and oxygen are mixed prior to introduction into the preheater. Also, temperature may be controlled through the use of an auxiliary heat source (as will be discussed hereinafter.)

In conventional open-hearth furnaces, auxiliary heat is oftentimes added to the melting process by electrical boost. The usual means of electrical boosting incorporates the immersion of pairs of electrodes into the glass melt within the furnace. In the present invention, plasma torches 600 or electrical arc discharges can be used to augment thermal input into the glass melting process. Plasma torches are well known in the art and are devices for generating gas plasmas. A plasma is a gas which has been highly ionized; that is, a large percentage of the electrons have been stripped from the atoms of the gas thereby making the gas electrically conductive. The most common types of plasma torches are either of the transferred arc type or the non-transferred arc type. In the transferred arc design, a plasma supporting gas is passed between an electrode (typically, the cathode) and material to be processed which also serves as an electrode (typically, the anode). Heat is transferred from the plasma to the processing material primarily by conduction. In the non-transferred arc device, the plasma supporting device is passed through the self-contained electrodes (cathode and anode) and heat is transferred to the plasma supporting gas, which in turn transfers heat to the processing materials by radiation and convection. In the present invention, the non-transferred plasma torch is the preferred design for most of the applications presently envisioned. Other types of plasma generators, such as electrodeless plasma generators which utilize time varying magnetic fields, are also being utilized in laboratory experiments, but are not presently available on a commercial basis.

In the configuration shown in FIG. 5, a plasma torch 600 is mounted at the head end 102 of a counter-rotating vortex preheater 100 along with inlets 120, 122 through which are delivered the fuel 30 and batch materials 10, respectively, into the preheater 100. Thermal augmentation using the plasma torch 600 is achieved by heating a heat transfer gas 40 passing therethrough to a temperature higher than the average gas temperature within the preheater 100 and injecting the heated transfer gas 40' into the preheater 100. The temperature of the injected transfer gas 40' is higher than the temperature which could have existed without auxiliary heating. By mixing the heated transfer gas 40' with the injected batch materials 10, fuel 30 and oxidizer flows 20a, 20b in the preheater 100, a higher temperature gas-solids suspension is formed in the upper region 108 of the preheater 100.

The heat transfer gas can be air, a fuel gas or an inert gas. In a typical application, the nature of the heat transfer gas (i.e., oxidizer, fuel or inert) is taken into account in establishing the overall combustion stoichiometry in the preheater. In applications where it is desirable to maintain oxidizing conditions in the preheater, the heat transfer gas will generally be air. In applications where it is desirable to maintain reducing conditions in the preheater, the heat transfer gas will typically be a reducing or a fuel gas.

The use a of plasma torch or the use of other sources capable of producing high heat, such as an electrical arc discharge, raises the combustion preheater chamber temperature without increasing the combustion air preheat temperature via a heat recuperator or the level of oxygen enrichment. The use of heat recuperators to elevate the combustion air temperature and oxygen enrichment are common means of achieving high temperatures in combustion processes. The level of heat recuperation and oxygen enrichment is often dictated by economic considerations. The achievement of high air preheat temperatures with recuperators is often limited by materials of construction as well as other engineering considerations. Therefore, the use of plasma generators provides a means of increasing the reactor temperature by either providing additional heat to the fuel gas or to the oxidizer without the need for additional heat recovery equipment or oxygen storage/generation equipment. In the present invention, the plasma generator is not the primary heat source for the process, but is used as a process trim or an adjustment input. Thus, by using the plasma torch, the apparatus and method otherwise remain the same as discussed with respect to the apparatus shown in FIG. 2.

In the embodiment of the invention shown in FIG. 6, a slagging gasifier 400 is included to provide a high temperature fuel gas 403 for injection into the upper region 108 of the counter-rotating preheater 100. The slagging gasifier 400 is closely linked to the preheater 100 in order to minimize the heat losses in the interconnecting duct work. Other types of gasifiers can also be used, but generally they operate at lower temperatures, are not as thermally efficient, and are more expensive. Therefore, the close-coupled slagging gasifier is a preferred gasifier, but is not the only possible fuel gas source for the process. The use of a slagging cyclone gasifier 400 is also preferred since it is capable of removing a majority of any fuel ash in the form of molten slag 401.

In the cyclone gasifier 400, fuel 30 (typically pulverized coal) is introduced at the head 406 of the gasifier through a suitable injector assembly 408 (such as a commercially available coal injector). Additionally, it is preferable that preheated combustion air or other oxidizing material 20 be introduced through an inlet 409 tangentially to the inside of the cylindrical gasifier 400 in order to cause a strong swirling motion within the gasifier 400. The result of the swirling motion of the gases within the gasifier is the separation of most of the fuel ash from the coal to the walls of the gasifier in the form of molten slag 401. The slag is removed from the gasifier through a suitable slag trap 410. Typically a small amount of the coal ash (i.e., less 30%) is not separated in the cyclone gasifier and is carried over with the heated fuel gas 403 into the batch preheater 100.

The raw fuel gases 403 and any ash carryover exit the gasifier 400 into a gasifier/preheater interface assembly 500 prior to introduction into the preheater 100. The interface assembly 500 also contains inlets 502, 504 for the injection of batch materials 10 into the hot raw gas 403. The mixing of the hot raw gas 403 and the batch materials 10 in the interface assembly results in a heated gas-solids suspension 404 which is introduced into the upper region 108 of the preheater 100. The gas-solids mixture injects into the preheater through a duct or a nozzle 506 located along the longitudinal axis of the preheater 100.

Figure 8:
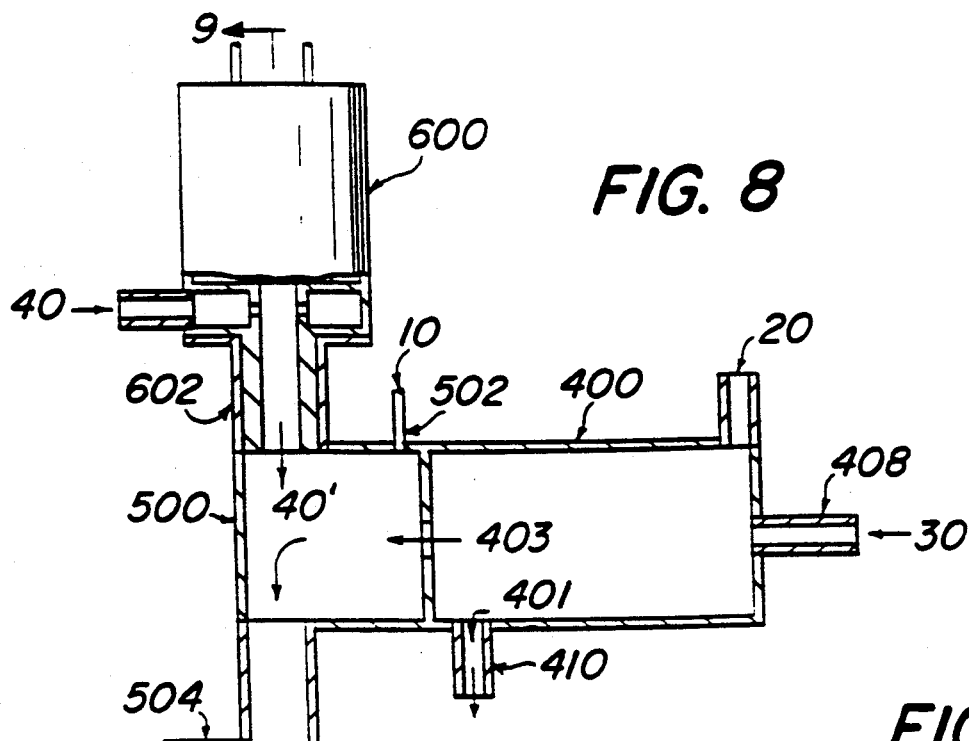
FIG. 8 is a diagrammatic cross-sectional view of an embodiment of the present invention which includes a cutaway view of a plasma torch attached to a slagging cyclone gasifier.

The interface assembly 500 is provided to minimize the wall heat transfer losses while providing a flow straightening mechanism for the swirling gases exiting the cyclone gasifier. The flow straightening is accomplished by providing a tangential exit 505 which is co-current with the direction of swirl. It is also a convenient location for the introduction of batch materials 502, 504 as well as a possible attachment point for a plasma torch (FIG. 8). In all cases, the preferred introduction of batch materials is co-incindent with the exit duct of the interface assembly. The preheater 100 as shown in FIG. 6 and the operation thereof are essentially the same as described for the embodiment shown in FIG. 2.

Figure 9:
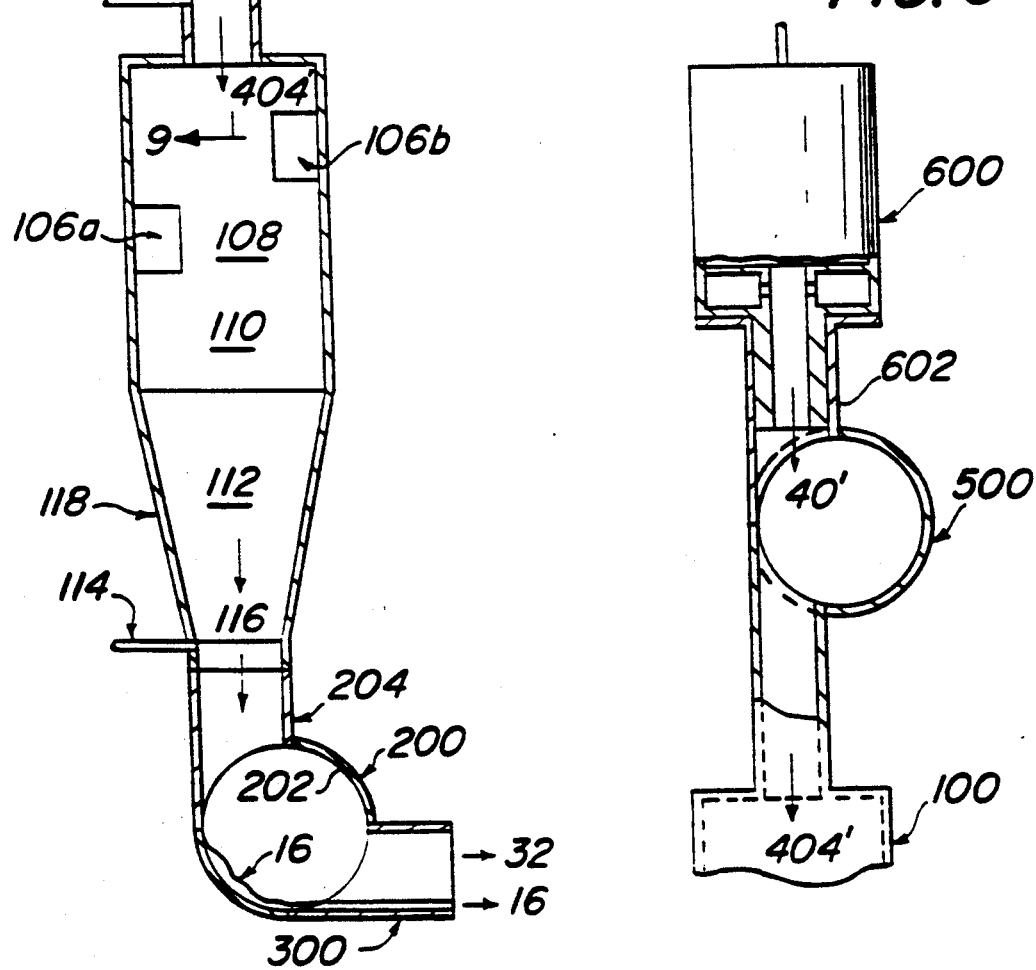
FIG. 9 is a sectional view taken along the line 9—9 in FIG. 8 showing the orientation of the plasma torch relative to the gasifier exit assembly.

In addition to the embodiment of the invention shown in FIG. 6, wherein a slagging gasifier 400 is provided, as shown in FIG. 8, a plasma torch 600 may be connected to the interface assembly 500 connecting the slagging gasifier 400 to the combustion preheater 100. Electric arc discharges could also be used to electrically boost the process; however, they are not as compact and convenient to interface with the process unit and are more cumbersome to incorporate into the design. The plasma torch 600 can be used to provide thermal energy to a transfer gas 40 directed therethrough. The heated transfer gas 40' (i.e., plasma supporting gas) will typically be heated to temperatures in the range of 7000° F. to 17,000° F. Air preheated by a recuperator is typically limited to a temperature of 1200° F. to 2200° F. The ultimate temperature which can be achieved within the process unit is dictated primarily by considerations of survivability of the wall containment materials. The heated transfer gas 40' heated by the plasma torch is introduced into the cylindrical interface assembly 500 through an inlet 602 which is preferably positioned tangential to the interior of the interface assembly (FIG. 9). Mixing of the gases 40', 403 occurs within the interface along with the batch materials 10 to form a higher temperature gas-solid suspension 404'. This gas-solid suspension 404' has a temperature higher than would be possible without the auxiliary heating source/plasma torch 600.

The remaining elements of the embodiment shown in FIG. 8 are the same as previously described.

The method and apparatus discussed in association with FIGS. 1-9 have been presented primarily with the consideration that the apparatus would be used to melt glass batch or other mineral matter under slightly sub-stoichiometric or oxidizing conditions. By oxidizing conditions, it is meant that there is more oxygen than is needed for complete combustion of the fuel. Therefore oxygen will be one of the species in the combustion products and there will be little carbon monoxide or hydrogen in the combustion products. Reducing conditions in contrast, means that there is insufficient oxygen to complete combustion. Under reducing conditions, the percentages of hydrogen and carbon-monoxide are substantially higher, and there is essentially no free oxygen available.

The atmosphere in which the glass is melted can have effect on the chemistry of the glass melting process. For example, the iron oxide re-dox states are influenced by the combustion stoichiometry which in turn can influence the color of the glass produced. In some applications, for example the smelting of metal-containing ores or metal-containing waste materials (e.g. waste dust from electric arc furnaces), it is necessary to operate the melting process under highly reducing conditions if significant levels of reduction are to be achieved. In the embodiments shown in FIGS. 10-12, apparatuses are shown which allow the reduction of metal-containing mineral matter or waste matter. Herein, as elsewhere, like components are presented by like numerals.

One purpose of the reduction embodiment is to economically produce iron or other metals from ores or metal-containing waste. The smelting of pulverized ores and the recovery of metals from electric arc furnace dust are examples of suitable applications of this technology. In the present invention, plasma torches 600a-c are used as a means of providing supplemental enthalpy input to the reduction process. The primary energy source for the reduction step comes, however, from the high temperature gasification of coal. Previous attempts solely utilizing electrically driven plasma technology have not been successful because of the unfavorable economics of these processes.

When the present invention is utilized for the reduction of ores or other metal oxide containing materials, the suspension preheating chamber 100 and the cyclone melter 200 must be operated under very reducing conditions and at high temperatures. The preferred embodiment of a reduction process consists of a slagging cyclone gasifier 400 which provides a hot reducing gas to the suspension preheater, now a reduction chamber 100', the cyclone melter 200 and plasma torches 600a-c for providing an enthalpy boost and additional high temperature reducing gas to the process heater. The slagging cyclone gasifier 400 removes normally 70% of the coal ash introduced into the cyclone gasifier, thereby reducing the amount of slag removal required in the metal making stages of the process. Nominal exit temperatures from the gasifier are in the range of 2800° F.-3500° F., with stoichiometries typically less than 60%. The materials to be reduced are introduced into the interface assembly 500 which connects the gasifier 400 and reduction chamber 100' assemblies, thereby decreasing the reducing gas temperature. The gas-solids suspension 404 then enters the well-stirred/plug flow reduction chamber 100' where additional high temperature reducing gases are injected through plasma torches 600b-600c, thereby providing additional enthalpy to the gases and mineral matter contained within the preheater assembly. Preferred reducing gases are hydrogen and carbon monoxide, which can be obtained from the reforming of natural gas.

The average temperature of the gas-solids suspension exiting the preheater assembly is governed by the types of materials being reduced. For iron making applications, the exit temperature of the gas-solids suspension from the preheater assembly is typically greater than 2800° F. The preheated mineral matter then enters the cyclone melter 200, where separation and deposition of the particulate matter occurs along the melter walls 202.

To achieve high levels of reduction, it is advantageous to introduce a pulverized solid carbon source such as coke or coal into either the interface assembly 500 along with the mineral matter or separately into the reduction chamber 100'. The interaction of the solid carbon with the liquid mineral matter results in high levels of metal oxide reduction. For iron reduction, the reaction involved can be represented as follows:

$$FeO + C = Fe + CO: \Delta H = +37084 \text{ cal/mole}.$$

Because carbon monoxide is one of the reaction products, it is generally accepted that the reduction of iron oxides by carbon proceeds indirectly by carbon monoxide and that the carbon dioxide formed then reacts with the carbon to reform carbon monoxide as follows:

$$FeO + CO = Fe + CO_2: \Delta H = -4136 \text{ cal/mole}$$

$$C + CO_2 = 2CO: \Delta H = +41220 \text{ cal/mole}$$

Because the gasification of carbon by $CO_2$ is highly endothermic and also requires a high temperature to proceed at an acceptable rate, the overall reduction rate is controlled by the rate of gasification of carbon. The rate of gasification of carbon will depend on the reactivity of the carbon, the temperature, and the availability of heat to maintain the reaction. Therefore, the rate of reduction by solid carbon ultimately depends on the rate of heat transfer from the heat source to the reacting materials. In the present invention the use of fine particles heated in suspension and the convective mixing of the liquid layer formed in the cyclone melter serves to enhance the rate of the overall reduction process.

To achieve effective levels of metal oxide reduction, it is known that the reducing gas ratio (RGR) which is defined as:

$$RGR = (CO + H_2)/(CO + CO_2 + H_2 + H_2O)$$

should be at least 0.6 or greater.

As stated previously, the primary components of these embodiments include a slagging cyclone gasifier 400; a gasifier/preheater interface 500 connecting the gasifier 400 to a preheater/reduction chamber 100'; a cyclone melting chamber 200 at the exit end of the reduction chamber 100'; a cyclone exit assembly 300 at the exit of the cyclone melting chamber 200; and one or several auxiliary gas heating assemblies, one assembly 600a being connected to the interface 500 and the other assemblies 600b and 600c being connected to the reduction chamber 100'.

The preheater/reduction melter chamber 100' is essentially the same as the preheater 100, however, the refractory linings of the chamber 100' will have to be different to survive the strong reducing conditions which will exist therein.

The slagging cyclone gasifier 400 produces a hot reducing gas 403 which becomes the primary reductant for the pulverized ore or metal-containing waste introduced into the reduction chamber 100'. Ore-containing mineral matter 15 and additional reducing agents 50, such as pulverized coal, pulverized coke, liquid hydrocarbon fuels or gaseous hydrocarbon fuels, are introduced through inlets 502, 504 into the interface assembly 500.

Figure 10:
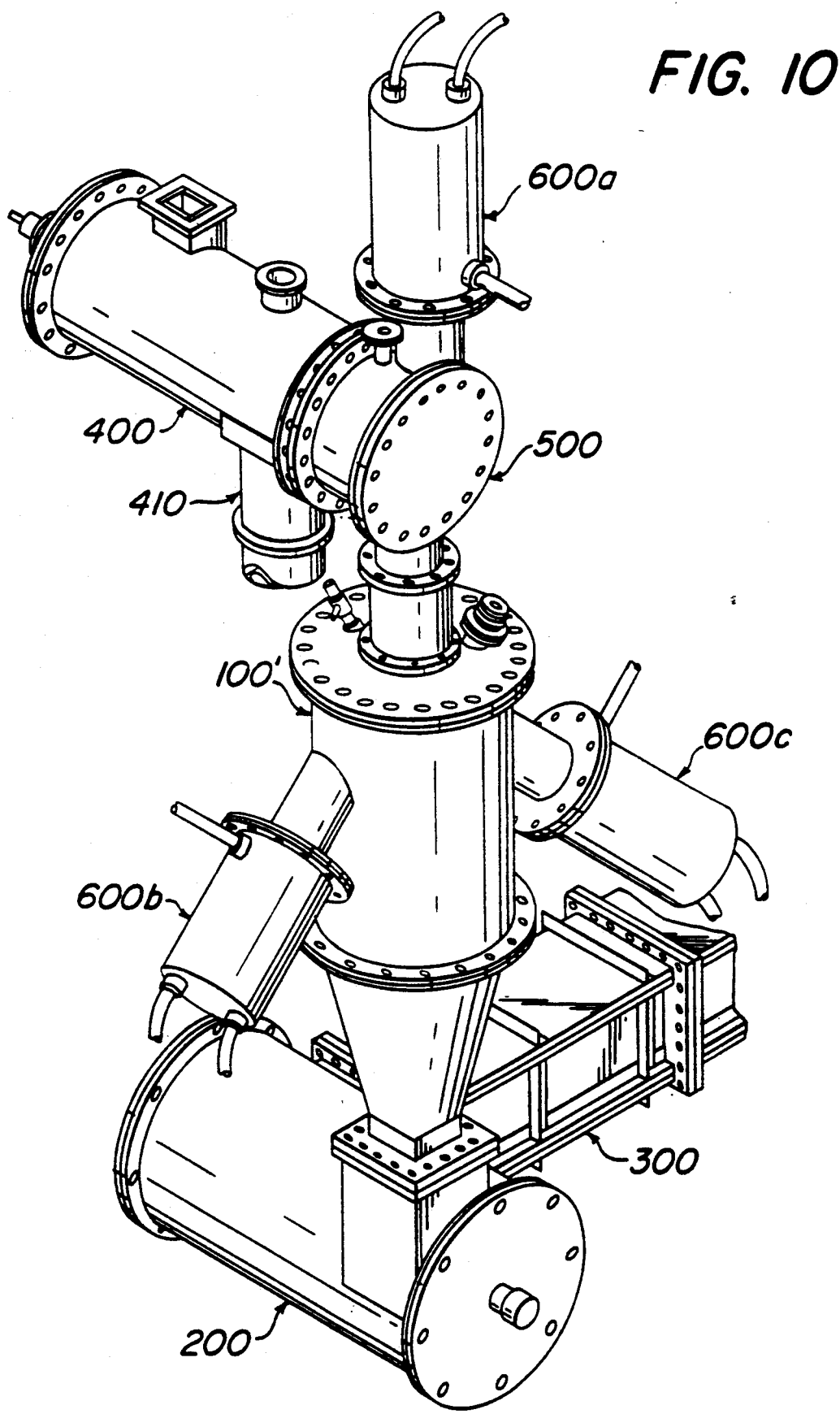
FIG. 10 is an isometric view of an embodiment of the present invention which includes plasma torches affixed to gas/air inlets of an impinging jet suspension preheater/reducing chamber.
Figure 11:
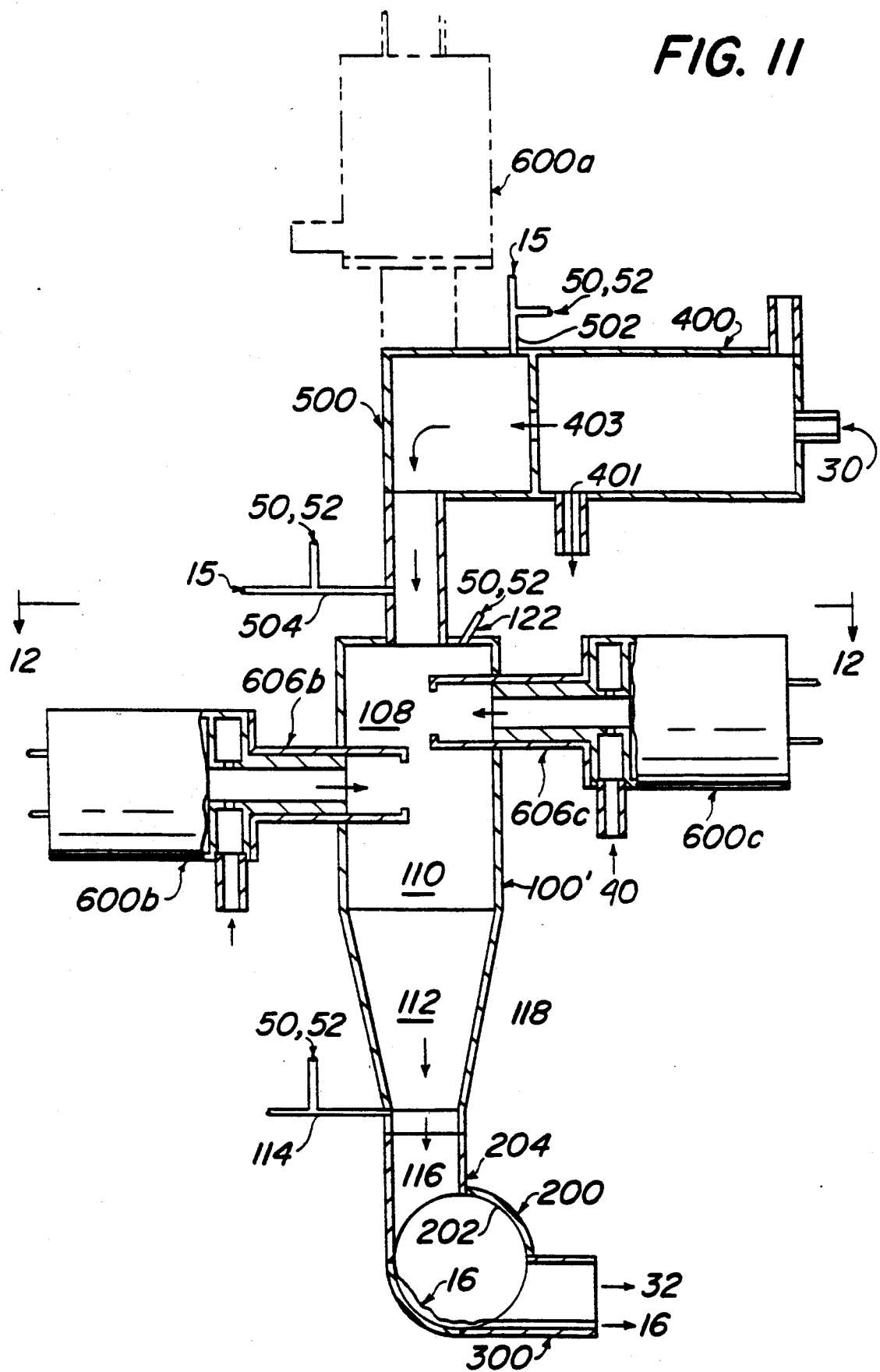
FIG. 11 is a diagrammatic cross-sectional view of an embodiment of the present invention which includes cutaway views of plasma torches affixed to the gas/air inlets of a counter-rotating vortex suspension preheater/reducing chamber.

Because it is oftentimes advantageous to elevate the temperature of the gas-solid suspension 404 exiting the interface 500 into the upper region 108 of the reducing chamber 100', as shown in FIGS. 10–12, plasma torches 600b, 600c are provided to heat reducing gases which are injected through inlets 606b, 606c attached to the reduction chamber 100'. These plasma torches can be used to obtain the desired high temperatures (in the range of 3,000° F.) within the chamber 100'. To maintain the highly reducing condition in the reducing chamber, it is not desirable to introduce additional oxidizing materials into the chamber 100' as provided in the previous embodiments; however, the introduction of additional reducing agents is permitted and desirable. These additional reducing agents can be introduced and heated, by means of the plasma torches 600b, 600c or by other heating means and introduced into the reducing chamber through the inlets 606b, 600c. The function of these inlets is similar to the functioning of the inlets 106a, 106b into the combustion chamber in the embodiment shown in FIGS. 1 and 2; that is, to produce a region within the chamber 100' where the suspended liquid-solid material and/or other reducing agent such as coke or coal particles are correctively heated by the gases in the preheater. A typical configuration of the reducing chamber/preheater 100' is a counter-rotating vortex reactor as shown in FIG. 11. In such a reactor it is possible to control the mixing within the upper region 108 of the chamber 100' by adjusting the mass flow and inlet velocities into there: as previously described in conjunction with the preheater 100.

An alternate configuration of the reducing chamber 100' is the opposed jet design shown in FIG. 10 wherein the heated reducing gases from the plasma torches 600b, 600c are injected upwardly toward each other into the upper region 108 of the chamber 100' so that the gases impinge preferably at a 45° angle and produce the well-mixed conditions in the upper region 108. While 45° is the preferred angle of inclination of the plasma torches 600b, 600c, the angle may be within the range of 30°–60°. The configuration is similar to that discussed with respect to FIG. 4.

Preferred reducing gases to be heated by the auxiliary heat sources 600a, 600b, 600c include hydrogen, carbon monoxide, natural gas or various mixtures thereof. Natural gas can be used as fuel and as a reducing gas. The disadvantage of using natural gas directly as a reducing gas with a plasma torch, however, relates to soot formation which can occur through the cracking of $CH_4$. Mixtures of hydrogen and carbon monoxide do not have this problem. If the time-temperature requirements dictate, additional mineral matter can be injected through duct 114 adjacent the exit end 118 of the chamber 100'. Additional reducing agent 50 may also be added to the suspension within the chamber 100' at the same time the additional mineral matter is injected through inlet 114 into the preheater. A preheated gas-solids suspension 116 composed of the suspended mineral matter and the heated reducing gases exits the chamber 100' into the cyclone melting chamber 200 by means of a suitable inlet duct assembly 204. As with the previous embodiments of the invention discussed herein, the preheated mineral matter, is separated, dispersed and mixed along the cyclone melter walls 202 where melting of the mineral matter occurs.

To reach high levels of reduction, it may be necessary to provide solid carbon in physical contact with the melted mineral matter within the cyclone melting chamber during the melting process to effect liquid-solid reduction reactions. In order to make sure the solid carbon material is available in the cyclone melting chamber 200, the time-temperature histories of the pulverized carbon containing materials introduced into the preheater can be controlled as previously described. Preferred alternative locations for the introduction of the solid reducing agents 52 are the interface assembly 500 at inlets 502, 504, the head end of the reduction chamber 100' at inlet 122 and near the exit of the chamber 100' at inlet 114.

Without further elaboration, the foregoing will so fully illustrate my invention that others may, by applying future knowledge, adopt the same for use under various conditions of service.

What I claim as my invention is:

1. An apparatus for processing materials under reducing conditions, said apparatus comprising:
   gasifier means for producing a hot reducing gas;
   reduction chamber means for receiving and treating said materials to be reduced with reducing gases, said reduction chamber means having an outlet therefrom;
   interface means connecting said gasifier means and said reduction chamber means for directing said reducing gas into said chamber means;
   enthalpy boost means connected to said reduction chamber means for providing an enthalpy boost and high temperature reducing gas into said reduction chamber means and for creating a well-stirred region within said reducing chamber means;
   first means for introducing said material to be reduced into said interface assembly means; and
   melter means at said outlet of said reduction chamber means for receiving particulate matter from said reduction chamber and for separating and depositing said particulate matter onto the wall thereof.

2. An apparatus as claimed in claim 1, further comprising second means for introducing said material to be reduced directly into said reduction chamber means.

3. An apparatus as claimed in claim 1, wherein said reduction chamber means is comprised of a cylindrical, vertically positioned chamber, said chamber having said well-stirred region at the upper end thereof.

4. An apparatus as claimed in claim 3, wherein said enthalpy boost means is positioned tangentially to said cylindrical chamber wall.

5. An apparatus as claimed in claim 4, wherein said enthalpy boost means into said chamber comprises at least two vertically spaced plasma generators directed into said well-stirred region of said chamber.

6. An apparatus as claimed in claim 4, wherein said plasma generators are vertically spaced apart.

7. An apparatus as claimed in claim 3, wherein said enthalpy boost means is comprised of at least two plasma generators positioned at 30°-60° angles through said chamber wall so that said high temperaure reducing gas therefrom into said chamber impinges at an angle of 30°-60°.

8. An apparatus as claimed in claim 1, comprising additional enthalpy boost means connected to said interface means for introducing a high temperature reducing gas into said interface means.

9. An apparauts as claimed in claim 8, wherein said additional enthalpy boost means comprising a plasma generator.

* * * * *